Patented Feb. 28, 1928.

1,660,696

UNITED STATES PATENT OFFICE.

HUGO WALLIN, OF DJURSHOLM, SWEDEN.

PROCESS OF PRODUCING CELLULOSE AND OTHER CHEMICAL PRODUCTS.

No Drawing. Application filed September 28, 1925, Serial No. 59,166, and in Sweden October 8, 1924.

It is known to obtain cellulose from wood, straw, etc., by boiling under pressure with caustic alkali, for example, NaOH, NaSH, $Na_2S$, and to completely dissolve wood and other organic materials in caustic alkali and to treat the liquors thus produced with caustic alkali under high pressure in accordance with the process disclosed in the patent application Serial No. 632,981 of Hugo Wallin, filed April 8, 1923, and to evaporate and dry distil such liquors with caustic alkali.

In the regeneration of the caustic alkali for reuse it is first recovered principally as sodium carbonate which is then causticized with lime.

It has now been found that the treatment of the wood, straw, etc., may be accomplished by the use of alkali silicates and the present invention therefore resides in replacing the caustic alkali of the prior processes referred to wholly or in part by alkali silicates. The alkali silicates may be regenerated directly for reuse thus eliminating the causticizing operation involved in the use of caustic alkali.

The action of the alkali silicates may depend upon the fact that in solution they hydrolize, for instance according to the reaction equation $$4Na_2O.SiO_2 + 3H_2O = 6NaOH + Na_2O.4 SiO_2.$$

The desired composition of the alkali silicate is maintained by replacing losses incident to the cooking operation by the addition during the regenerating operation of alkali containing materials (soda, sulfate, and silicates e. g. feldspar) and silicic acid containing material. Since during the fusion involved in the regeneration the silicates will dissolve sodium oxid or sodium sulfid which may be liberated $$(Na_2CO_3 + C = Na_2O + 2CO$$

or $$Na_2SO_4 + 4C = Na_2S + 4CO)$$

it is not necessary that a quantity of silica corresponding to the formula $Na_2SiO_3$ be present. Since the quantity of $Na_2O$ and $Na_2S$ which may be dissolved depends upon the temperature of the furnace, the most suitable addition of $SiO_2$ must be determined for every special case.

If the alkali or silicic acid containing material added during the regenerating operation contains clay ($Al_2O_3$), when the alkali silicate fusion is extracted, this $Al_2O_3$ will appear in the form of insoluble compounds such as $$Al_2O_3.Na_2O.SiO_2 + 9H_2O$$

which may be separated by filtration after which the alkali silicate solution may be evaporated without danger of forming incrustations in the evaporating apparatus. The separated aluminate may then be added to a subsequent fusion and its alkali content recovered as caustic alkali as indicated in the following reaction equations:

$$Al_2O_3.Na_2O.SiO_2 + Na_2CO_3 = Na_2O.Al_2O_3 + Na_2O.SiO_2 + CO_2$$

$$Na_2O.Al_2O_3 + Na_2O.SiO_2 + H_2O = Al_2O_3.Na_2O.SiO_2 + 2NaOH$$

In the treatment of silicic acid containing materials such as straw, bamboo, etc, sufficient $SiO_2$ may be introduced or the loss of alkali may be so small that an excess of $SiO_2$ results. This excess of silica may be removed by adding lime ($CaCO_3$) whereby, upon dissolving the melt, calcium silicate remains undissolved and is separated by filtration.

In the production of chemical products either alone or from the liquor resulting from the boiling of cellulosic material, using dry distillation as the final step, the temperature may be carried up to 600 to 700° C. whereupon the alkali silicates are reformed. Or the liquor may be evaporated and the residue calcined at such a low temperature (under 1000° C.) that the ashes do not melt.

The addition of silicic acid may be made in the boiler during the cooking operation in the form of waterglass or easily soluble silicic acid such as kieselguhr or finely powdered sand.

A difficulty may arise in that the melting point of the mixture in the melting furnace may rise too high. This may be met by using a mixture of potassium and sodium silicate, for instance potash feldspar is added, or by the addition of neutral salts which lower the melting point. On the other hand the temperature of the furnace may be increased by using preheated air instead of cold air, or by the use of extra fuel and the extra heat of the combustion gases leaving the melting furnace as well as the heat of the lyes may be utilized by a boiler located behind the melting furnace.

I claim:

1. In the process for the preparation of cellulose and other chemical products involving the cooking of cellulosic material with an alkali silicate cooking liquor and regenerating said cooking liquor for reuse by a treatment involving evaporating the used cooking liquor and smelting or destructively distilling the resulting residue, the step which consists in adjusting the silicic acid content of said alkali silicate cooking liquor whereby to render unnecessary the causticization of the smelted or destructively distilled residue.

2. Process of producing cellulose and other chemical products which comprises cooking cellulosic material with an alkali silicate cooking liquor and regenerating the alkali silicate for reuse by evaporating the used cooking liquor and calcining the residue with additions of alkali containing material and silicic acid containing material to replace losses incident to the cooking operation.

3. Process of producing cellulose and other chemical products which comprises cooking cellulosic material with an alkali silicate cooking liquor, adding readily soluble silicic acid containing material to the alkali silicate cooking liquor during the cooking operation, and regenerating the alkali silicate for reuse by evaporating the used cooking liquor and calcining the residue with additions of alkali containing material and silicic acid containing material to replace losses incident to the cooking operation.

4. Process of producing cellulose and other chemical products which comprises cooking cellulosic material with an alkali silicate cooking liquor, and regenerating the alkali silicate for reuse by evaporating the used cooking liquor, calcining the residue with additions of alkali, silicic acid and alumina containing materials, dissolving the resulting mixture in water and separating insoluble aluminates from the resulting solution.

5. Process of producing cellulose and other chemical products which comprises cooking cellulosic material with an alkali silicate cooking liquor, and regenerating the alkali silicate for reuse by evaporating the used cooking liquor, calcining the residue with additions of alkali, silicic acid and alumina containing material, dissolving the resulting mixture in water, separating insoluble aluminates from the resulting solution, and adding the separated aluminates to a subsequent residue.

6. Process of producing cellulose and other chemical products which comprises cooking cellulosic material with an alkali silicate cooking liquor and regenerating the alkali silicate for reuse by evaporating the used cooking liquor and calcining the residue with the addition of a material capable of lowering the fusion temperature of said residue.

7. Process of producing cellulose and other chemical products which comprises cooking cellulosic material with an alkali silicate cooking liquor and regenerating the alkali silicate for reuse by evaporating the used cooking liquor and calcining the residue with additions of alkali containing material and silicic acid containing material to replace losses incident to the cooking operation at a temperature above about 600° C. and below the fusion temperature of the residue.

In testimony whereof I affix my signature.

HUGO WALLIN.